July 6, 1965  E. J. BARTHOLET ETAL  3,193,246
BIFACED GATE VALVE HAVING WEDGE EXPANDING MEANS
Filed Jan. 26, 1962  3 Sheets-Sheet 1
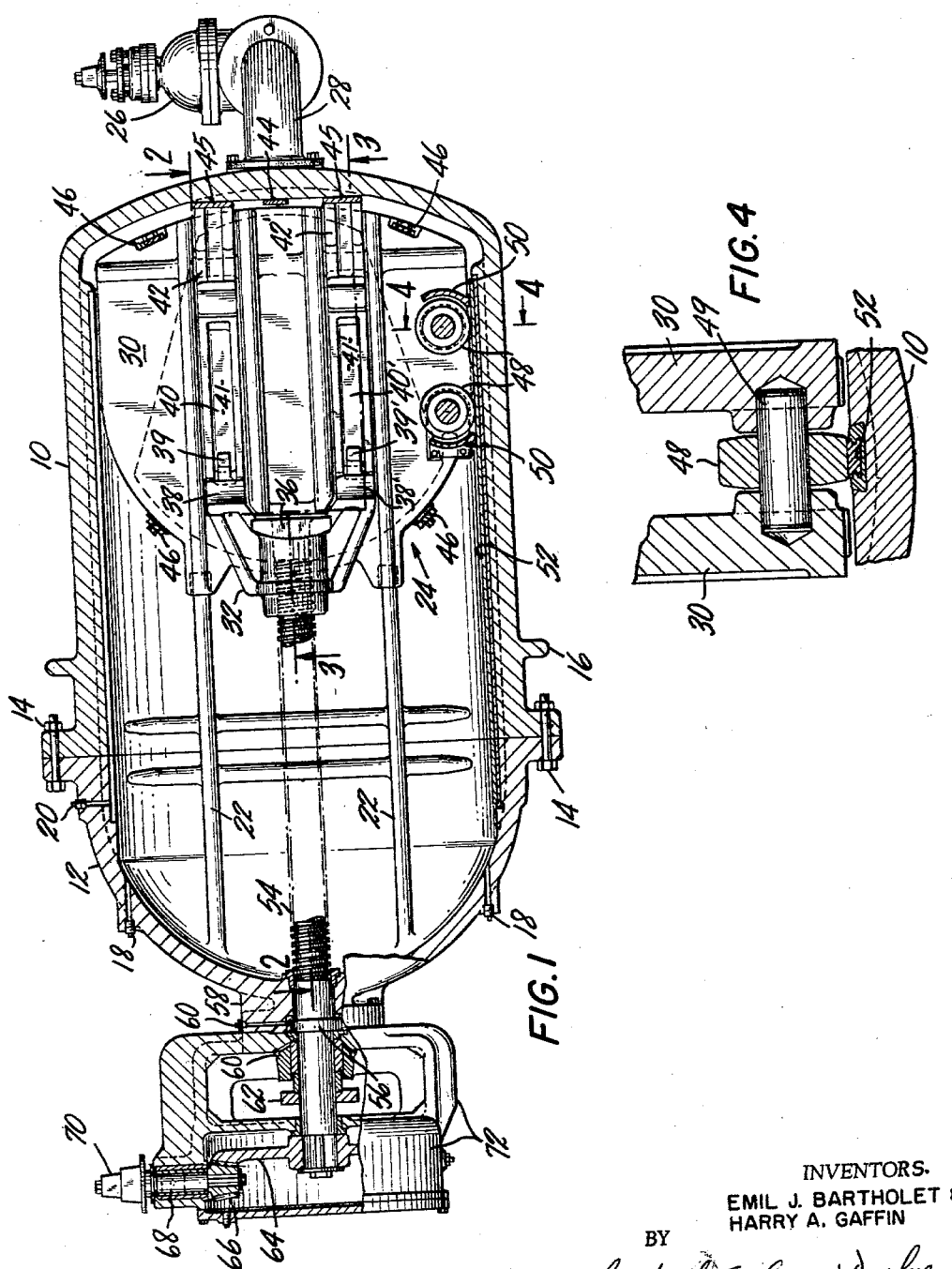
INVENTORS.
EMIL J. BARTHOLET &
HARRY A. GAFFIN
BY
Bumbaugh, Feel, Graves & Donohue
their ATTORNEYS.

July 6, 1965 E. J. BARTHOLET ETAL 3,193,246
BIFACED GATE VALVE HAVING WEDGE EXPANDING MEANS
Filed Jan. 26, 1962 3 Sheets-Sheet 2
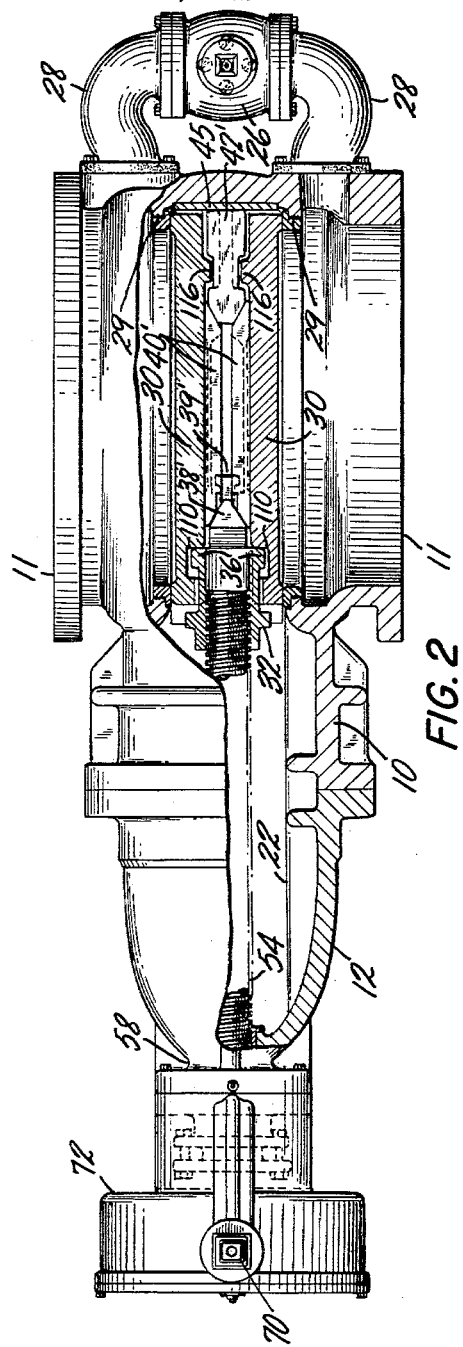
INVENTORS.
EMIL J. BARTHOLET &
HARRY A. GAFFIN
BY
Brumbaugh, Free, Graves & Donohue
their ATTORNEYS.

United States Patent Office 3,193,246
Patented July 6, 1965

3,193,246
BIFACED GATE VALVE HAVING WEDGE
EXPANDING MEANS
Emil J. Bartholet, Union, and Harry A. Gaffin, East
Orange, N.J., assignors to A. P. Smith Manufacturing
Company, East Orange, N.J., a corporation of New
Jersey
Filed Jan. 26, 1962, Ser. No. 169,000
8 Claims. (Cl. 251—198)

This invention relates to valves and more particularly to gate valves utilizing a novel wedging arrangement which provides a high degree of reliability of valve operation, especially when operating the valve under adverse conditions.

Gate valves wherein one or more plates or discs are inserted transversely across the conduit and wedged into sealing engagement with associated valve seats to control the flow of fluid have been found generally effective in high pressure systems, but known forms thereof present certain disadvantages.

In some types of prior art valves, the wedging force applied to the valve discs in the closed position is imperfectly released before the discs are withdrawn transversally from between the seat rings, resulting in increased friction and wear on the sealing surfaces. In other types of valves, the wedging mechanism is often prematurely actuated under certain fluid flow conditions in the valve, thereby preventing the valve from being closed fully. In such a case, the application of additional force to close the valve would result only in damage to the sealing surfaces.

Attempts to alleviate these disadvantages have been made but their limited success has been accomplished at the expense of using unduly complicated arrangements of parts. Thus presently known wedging arrangements are still relatively ineffective and in some of them, the wedging structure remains stationary in the valve to obstruct the fluid path, thereby further reducing the valve efficiency.

It is, therefore, the primary object of the present invention to provide novel gate valve means wherein the aforementioned disadvantages of prior art devices are substantially or entirely avoided.

It is a further object of the present invention to provide gate valve means wherein wedging action is utilized to provide substantially equally distributed pressures or loads over the valve seat area when the valve is closed.

Another object of this invention is to provide an improved gate valve having novel wedging means which are simple in construction and which are so proportioned as to insure positive and complete release of the wedging pressure before moving the valve discs across their respective seats upon withdrawal or opening of the valve.

A still further object of this invention is to provide improved gate valve means having a novel wedging structure that is carried by the gate structure and completely withdrawn from the fluid path upon opening of the valve.

An additional object of this invention is to provide an improved gate valve having novel wedging means which are not rigidly connected to, or an integral part of, the valve discs, whereby the wedging and unwedging actions are effected independently of movement of the discs.

Briefly, the present invention utilizes two sets of wedging elements spaced between the opposed faces of a pair of valve plates, the outer surfaces of which are arranged to meet in sealing engagement with a corresponding pair of valve seats. Each set of wedging elements comprises a pair of spaced male wedging surfaces between which are arranged a pair of elongated counterwedge members having their respective ends tapered or bevelled to provide a pair of female wedging surfaces adapted to engage the respective male wedges. The outer surfaces of the counterwedge members are in contact with the inner surfaces of the valve plates. Upon movement of the male wedging members towards one another, by continued turning of the valve stem after the gate structure is aligned with the valve seats, the respective pairs of elongated members are separated by the wedging action, urging the valve plates outwardly against the valve seats. All of the wedging members are carried by the valve plates and are removed from the fluid flow path upon opening of the valve.

The materials of the wedging members, and the angles of the wedging surfaces are so chosen as to prevent initiation of the wedging action or self-locking, while the valve discs are being moved into the closed position, and the free or non-rigid mounting of the wedging parts helps prevent premature wedging. Positive release of the wedging pressure as withdrawal or opening of the valve gate is initiated is assured by dimensional relationships and interconnections between valve discs and mating wedge members.

These and other features, objects and advantages of the present invention will become more apparent from the following detailed discussion of a preferred embodiment thereof, when taken in conjunction with the accompanying drawings, in which:

FIGURE 1 is a vertical cross-sectional view of a complete valve arrangement according to the present invention;

FIGURE 2 is a partial section of the valve of FIGURE 1 taken along the line 2—2;

FIGURE 3 is an enlarged cross-sectional detail of the wedging structure taken at line 3—3 shown in FIGURE 1;

FIGURE 4 is a partial cross section through the valve of FIGURE 1 taken along the lines 4—4 thereof showing the roller structure on the valve gate mechanism.

Figure 5:
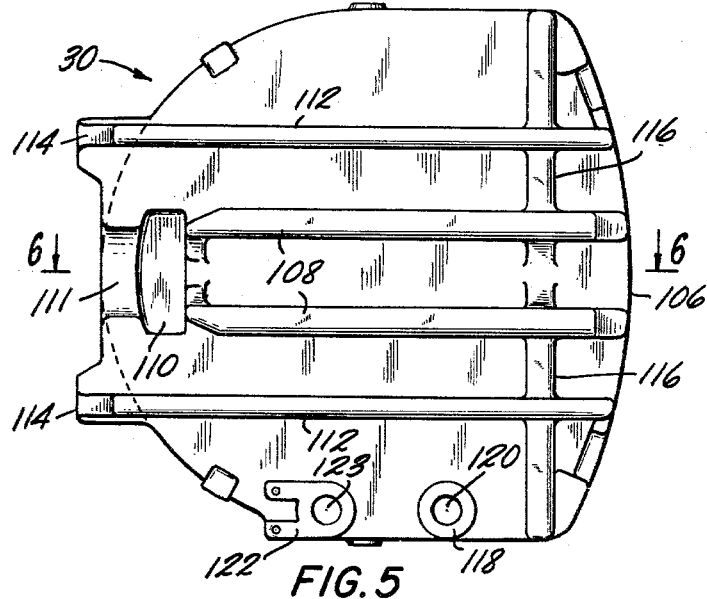
FIGURES 5, 6 and 7 are respectively a back view, a section, and a face view of a valve plate or disc of the present invention.

As shown in FIGURES 1 and 2, the valve includes a housing comprising a body portion 10 and a bonnet portion 12 having abutting flanges and being firmly fastened together by a means of bolts 14. The housing, preferably made of cast iron, may have a cross section transverse to its length substantially oval or elliptical in shape. Strengthening ribs such as 16 may be formed in the outer surface of the housing to add structural rigidity thereto. Flushing and test plugs 18 and vent plug 20 may also be provided in the bonnet portion to provide access to the interior of the valve structure. Although the valve is shown in the drawings with the gate structure moving horizontally, it will be realized that it may be used in the vertical position as well.

The interior surface of the housing may also be provided with ribs 22 running longitudinally thereof which serve as support rails for the gate structure 24 to be described hereinafter and also lend additional strength to the housing. A conventional bypass arrangement comprising a valve 26 and suitable conduits 28 is provided to balance pressures and thereby reduce the torque required to open and close the main valve.

As can be seen from FIGURE 2, the valve housing is provided with a pair of oppositely disposed flanged openings or ports 11 therein which are adapted to be coupled to sections of conduit and which define a fluid flow path through the valve. The interior rim of each of the valve openings 11 is provided with a valve seat or ring 29 such as of tempered bronze, threadedly engaging the valve body so as to be readily replaceable.

Figure 6:
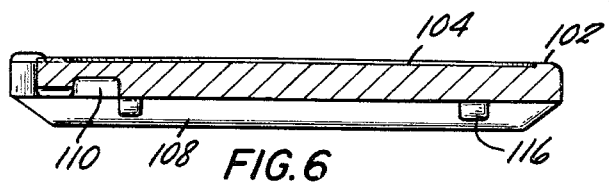
Figure 7:
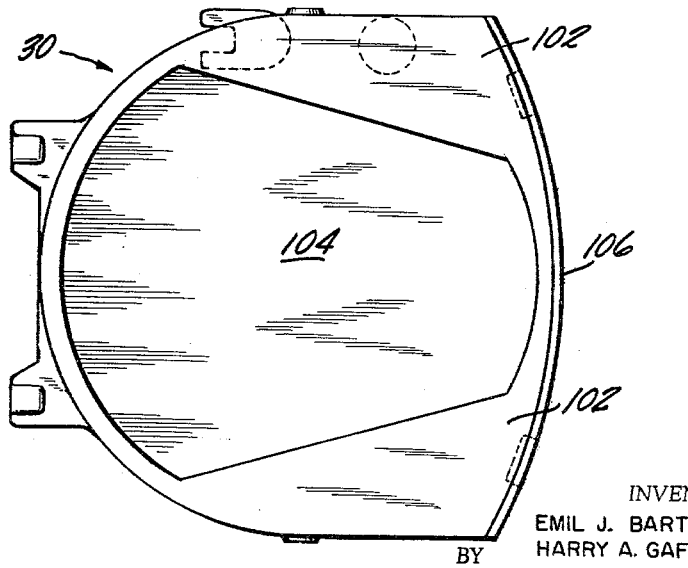

The gate structure, indicated generally at 24 in FIGURE 1, includes a pair of valve plates or discs 30, preferably of bronze, having oppositely disposed surfaces adapted to engage the respective valve seats 29 in sealing engagement therewith. Referring to FIGURES 5, 6 and 7, the valve disc includes an outer surface 102 adapted to engage the valve rings 29 and a central recessed portion 104. An edge 106 of the plate is curved to generally follow the curvature of the corresponding interior surface of the housing body 10. The particular configuration of the valve disc surface 102 forms part of the subject matter of application Serial Number 169,032, of one of the present inventors, filed concurrently herewith and assigned to the same assignee, and reference may be had to that application for a detailed discussion thereof. For the purposes of the present invention, the shape of the seating surface 102 need not be limited to that shown and may assume any desired contour capable of effecting a tight seal with the seat 29.

The opposite side of the valve plate 30 (FIGURE 5) includes a first pair of parallel raised ribs 108 beginning at the curved edge 106 of the plate and extending horizontally thereacross to a generally rectangular depression 110 provided in the plate. A further circular recess 111 connects depression 110 to the edge of the plate. A second pair of raised ribs 112 is disposed one on either side of the ribs 108 and parallel thereto, similarly extending from the curved edge 106 and terminating in ears 114.

Adjacent the curved end 106 of the valve plate and perpendicular to the ribs 108, 112, a pair of transverse ribs 116 are provided. As shown in FIGURE 5, these ribs respectively extend from respective ones of ribs 108, crossing ribs 112 and then to the outer edges of the valve plate. Except for a fillet portion, no transverse rib is provided between the ribs 108. As shown, the ribs 116 may be shallower than the ribs 108, 112. The lower edge of the plate 130 is also provided with a pair of raised bosses 118, 122, having respective blind end bores 120, 123, provided therein.

Returning now to FIGURE 1, the entire gate structure is moved into and out of sealing relationship with the valve seats 29 by means of a threaded shaft or stem 54 which engages stem nut 32. The latter is provided with an enlarged end portion 36 adapted to loosely engage the depressions 110 provided in the respective valve plates 30, the recess 111 accommodating the adjacent generally cylindrical portion thereof. The stem nut 32 is also provided with a pair of ears terminated in tapered male wedging portions 38, 38'. As can best be seen in FIGURE 2, the enlarged end portion 36 of the stem nut 32 is received between oppositely disposed recesses 110 of the two valve plates and will move the latter as the shaft 54 is revolved to open or close the valve.

The valve plates 30 are maintained in substantially parallel alignment by means of disc straps 46 bolted thereto with sufficient play to permit a small amount of displacement of the plates to or from each other. The gap provided between the ribs 108 of the valve plates is sufficient to receive the threaded shaft 54 as the gate structure is withdrawn from the closed position. In the open position, the ribs 22 interiorly of the bonnet 12 and the body portion 10 of the housing support the gate structure in substantial alignment with the opening between the valve seats 29.

The end or bottom of the body portion 10 of the housing is provided with a stop facing 44 which, when the valve is used vertically, contacts the bottom of the valve plate 30 in the closed position. When the valve is disposed horizontally, as shown, a slight clearance may exist between the plates and the facing 44. Additional stop facings 45 are provided to receive the ends of wedge members 42, 42', as will be described hereinafter.

The entire gate structure may be provided with a pair of rollers 48 mounted on shafts 49 rotatably received in the blind bores 120, 123 provided in the lower edge of the plates 30. As seen in FIGURE 4, these rollers are adapted to glide on tracks 52, made of a wear-resistant material such as hard bronze, set into a recess provided in the lower surface of the housing. A pair of scrapers 50 may be provided in either side of the rollers 48 to maintain the track 52 free of debris and thus insure proper alignment of the valve gate structure.

The shaft 54 is restrained from longitudinal movement in the housing by means of a stem collar 56 received within a suitable annular groove provided in neck portion 58 of the bonnet 12. At the end of the shaft 54, a bevel gear 64 is keyed or otherwise fixed for rotation therewith. The bevel gear 64 meshes with a pinion 66 fixed to a vertical shaft 68. An operating nut 70, which may be of rectangular in cross section to engage an operating device such as a hand wheel, is keyed to the upper end of shaft 68. The gear structure and the shaft end 54 are suitably enclosed in a housing 72 and provided with packing glands 62 of conventional form. Similarly, fittings 60 are provided to enable lubrication of the shaft. As can be readily appreciated, turning of the operating nut 70 by means of a hand wheel or other power source, transmits rotational motion through the bevel gears to the shaft 54 to withdraw or insert the valve gate structure 24 into the valve opening.

To provide the desirable wedging pressure discussed hereinbefore, two similar sets of wedging members are employed. The first of these sets comprises a male wedging portion 38 on the upper ear of stem nut 32, a pair of elongated counterwedge members 40 and a second male wedging member 42. The other set similarly includes male wedging portion 38' on the lower ear of stem nut 32, a pair of elongated counterwedge members 40' and an additional male wedge member 42'.

Each of the male wedging portions 38, 38' includes wedging surfaces 131 (FIG. 3) and is provided with an extension depending therefrom adjacent its center having oppositely opposed lug portions 39, 39', at its outer end. The lugs are received within central recessed slots 41, 41' in the counterwedge members 40, 40', each pair thereof having their respective slots facing one another to receive both of the lugs on the associated wedging portion. The ends of the slots adjacent the lugs are terminated by a shoulder 130 adapted to engage the lug as the stem nut is actuated to withdraw the gate structure from the closed position. Beyond the shoulder 130, each of the elongated members 40, 40' is provided with a bevelled surface 132, forming a female wedging surface for engagement with a wedging surface 131.

When the shaft 54 is rotated to open the valve, that is, move the valve gate to the left as it appears in the drawings, the lugs 39, 39', depending from the ears of the stem nut 32, will engage the associated shoulders 130 on each of the four elongated members 40, 40'. Since the lugs are dimensioned to be spaced from the corresponding shoulders by a small amount when the valve is in its closed position, during withdrawal of the valve the lugs will not engage the shoulders 130 until the wedging contact of surfaces 131, 132, is separated. This releases the wedging pressure to allow free withdrawal of the valve gate structure.

The additional or bottom male wedge members 42, 42' are provided with transversely arranged slots 43 on either side thereof adapted to engage the ribs 116 on the surfaces of the plates 30. With the gate in its assembled condition, as seen in FIGURE 2, the members 42, 42' are loosely engaged by the ribs 116 and are prevented thereby from being removed from between the plates. The left hand or upper ends of the wedging members 42, 42' are provided with corresponding male wedging surfaces 134, adapted to engage complementary female wedging surfaces 136 at the lower or bottom end of the counterwedge members 40, 40'.

Assuming the valve to be in its closed position, as it is shown in FIGURES 1, 2 and 3, the stem nut is being urged towards the right hand or bottom end of the valve with a force P applied through the medium of the shaft 54. An equal reaction force P is exerted by the housing on the lower wedging members 42, 42' by reason of their being pressed against the facing plate 45 by the counterwedge members 40, 40'. The wedging action, exerting an outward pressure against the plates 30 to urge them into tighter contact with the sealing rings 29, is obtained through the medium of the mating wedging surfaces 131, 132 and 134, 136.

Since each of the wedging contacts has applied to it the same force P, and each is at the same wedging angle, equal forces Q are applied perpendicularly to the plane of each of the plates 30 at opposite ends of the respective counterwedge members. These members are provided with contacting surfaces 133 adapted to bear against the inner surfaces of the plates 30. As will be appreciated from consideration of FIGURE 1, this action has the effect of applying equal wedging forces at four points spaced adjacent the contact area between the valve discs and the valve seats. Uniform closure of the valve is thereby assured.

Upon opening of the valve, rotation of the shaft 54 withdraws the stem nut 32 and its depending ears from between the counterwedge members, breaking the wedging contact between the surfaces 131, and 132. This also permits the surfaces 134, 136 to separate, relieving the forces Q applied against the valve discs and completely relaxing the wedging pressure. To further insure release of the wedging action the counterwedge members 40, 40' are slightly withdrawn by lugs 39, 39' from their contacts with lower wedging members 42, 42' before movement of the valve discs commences.

As the stem nut is further withdrawn the enlarged end portion 36 on the stem nut engages the left hand shoulder of the depressions 110 in the respective valve plates, pulling them towards the open position. Engagement of the lugs 39, 39' with the shoulders 130 simultaneously withdraws the counterwedge member 40, 40' along with the plates. The bottom or lower wedging members 42, 42' are carried along with the valve plates 30 by means of the ribs 116 thereon which engage the slots 43 in the members. With the valve completely opened, the entire gate structure is substantially entirely enclosed within the housing beyond the valve openings 11, thereby permitting unobstructed flow through the valve structure. None of the wedging members remain in the fluid flow passage to obstruct the flow therethrough, all being carried by the plate members 30.

Upon closure of the valve, enlarged portion 36 on the stem nut 32 engages the lower or right hand shoulders of the depressions 110 in the respective valve plates, urging them into the closed position. At the same time, the ribs 116 bear against the lower shoulders of the slots 43 in the bottom wedging members 42, 42', moving them towards the facing plate 45. Wedging portions 38, 38' bearing against the associated counterwedges 40, 40' carry the latter along with the remainder of the structure.

When the valve plates 30 are positioned with the sealing surfaces 102 in alignment with the seating rings 29, further rotation of the shaft 54 serves to force the wedging members 42, 42' into contact with the respective facing plates 45, thereby limiting their lateral movement. At this point, the wedging action commences. The wedging surfaces 130 on the stem nut 32 continue to move in a lateral direction as the shaft is rotated, placing the wedging surfaces at both ends of the counterwedge members 40, 40' in contact with the respective male wedges 42, 42'.

As the pressure exerted by the movement of the stem nut 32 increases, increased forces are transmitted through the wedging surfaces outwardly against the valve plates, urging them more tightly against the valve seating rings 29. Finally, a point is reached at which no further wedging pressure is required, the forces Q being generated thereby being sufficient to maintain the valve plates against the sealing rings with the requisite pressure.

To provide optimum wedging force upon closing of the valve and to assure that the wedging surfaces disengage promptly upon release of the applied wedging force, several factors of the wedging surfaces themselves must be taken into account. If the wedging surfaces were friction-free, no problems would arise and the forces, angles, etc. involved could be easily determined. However, considerable friction is encountered between the wedging surfaces which must be provided for in their design.

With the materials used in the type of valve under consideration herein, i.e., bronze or brass, it was found that optimum wedging conditions are achieved with a wedge angle of approximately 30°. The male wedges would then have a total included angle between the wedging surfaces of 60°. It was also found that with this wedging angle, no self-locking of the wedging surfaces occurred as a result of the frictional engagement therebetween. In fact, the relationship between the forces Q and P and the friction between the wedging surfaces is such that the wedging members tend to separate on their own and are, in effect, self-releasing, upon release of the force P. This lends to easier and smoother operation of the valve and permits the use of unmachined castings for the wedge elements. Thus, the wedging action of the present invention not only provides improved distribution of wedging pressure against the valve plates when the valve is closed, but also permits rapid release of the wedging pressure to render possible the opening of the valve with a minimum application of force.

Valves of the type described herein have been adapted for use in conduits having diameters of from 16 to 30 inches, and with pressures of up to 175 lbs. per square inch. It is under such high pressure conditions that the improved wedging action of the present invention is of particular advantage, however, it will be realized that the same principles may be applied to valve structures of other sizes and operating at different pressures, with similar improvements in operation.

While the invention has been particularly shown and described with reference to a preferred embodiment thereof, it will be understood by those skilled in the art that various modifications in form and details may be made therein without departing from the spirit and scope of the invention as set forth in the appended claims.

What is claimed is:

1. A gate valve comprising, a pair of generally parallel valve discs, a valve stem, a stem nut threaded on said valve stem and engaging each of said valve discs, means to rotate said valve stem to move said valve discs between open and closed conditions of the valve, a plurality of male wedging surfaces formed on said stem nut and extending between said valve discs, a like plurality of male wedging members carried between and movable with said discs, each of said male wedging members being longitudinally spaced from and facing a corresponding male wedging surface on said stem nut in aligned relationship therewith, and a pair of elongated counterwedge members for each set of aligned male wedging surfaces and male wedging members, the ends of said counterwedge members being bevelled to provide female wedging surfaces to mate with its respective male wedging surface and male wedging member, the outer surfaces of said counterwedge members bearing at least at the ends thereof opposite said female wedging surfaces against correspondingly spaced points on the respective inner surfaces of said discs, actuation of said stem to close said valve moving said male wedging surfaces on said stem nut towards said male wedging members to spread said counterwedge members and thereby urge said discs outwardly from one another at a plurality of spaced points thereon.

2. A gate valve according to claim 1 wherein the material of the male wedging surfaces on said stem nut, the male wedging members, and said counterwedge members, and the wedging angle thereof are selected to provide a frictional relationship therebetween such that they are self-releasing upon opening of the valve.

3. A gate valve according to claim 1 wherein the wedge angle between each of the male wedging surfaces on said stem nut, the male wedging members, and the female wedging surfaces on said counterwedge members, and the longitudinal axis of the wedge structure is in the order of 30°, whereby they are self-releasing upon withdrawal of said stem nut.

4. In a gate valve having a housing provided with a pair of aligned valve openings therein and adapted to be inserted between sections of conduit for control of flow therethrough, a valve seat for each of said openings, a pair of valve plates having surfaces adapted to contact said respective valve seats in sealing relationship therewith, means for selectively moving said plates into and out of engagement with said valve seats to close and open the valve, respectively, and wedging means comprising a first member carried between and movable with said valve plates and having one end adapted to bear against the interior surface of said housing when said plates are in engagement with said seats in the closed position of the valve, the other end being tapered to provide a pair of wedging surfaces, a second member carried by said moving means having one end tapered to provide a pair of wedging surfaces and extending between said plates, and a pair of complementary elongated members disposed between said plates, each having its respective ends forming mating wedging surfaces with corresponding wedging surfaces of each of said first and second members and adapted to be spread apart by relative movement of said first and second members towards one another, each of said complementary members having an elongated outer surface bearing at least at the ends thereof opposite said mating wedging surface against correspondingly spaced points on an inner surface of a respective plate, whereby said plates are urged against said valve seats under pressure with the valve in its closed position.

5. For use with a gate valve having a pair of generally parallel valve discs adapted to be brought by valve closure means into sealing engagement with corresponding valve seats disposed one on either side of said discs within the valve housing, means effective upon actuation of the valve closure means beyond the point at which said valve discs and said valve seats are in aligned relationship to urge discs and seats into sealing engagement under increased pressure, said means comprising, a pair of first wedge members carried between and movable with said discs each having one end adapted to contact the interior of said housing with said discs and seats in aligned relationship and the other end tapered to form a male wedging surface, a pair of second wedge members carried by said valve closure means extending between said discs and having their respective ends formed into male wedging surfaces, and two pairs of elongated members disposed between said discs, the ends of each of said pairs being tapered to form female wedging surfaces for cooperation with respective male wedging surfaces of one of each of said first and second members, each elongated member having an elongated outer surface which bears, at least at the ends thereof opposite said female wedging surfaces, against correspondingly spaced points on an inner surface of a respective valve disc, relative movement of said first and second members towards one another spreading said pairs of elongated members apart at both ends thereof to urge said valve discs at at least four spaced points thereon into sealing engagement with said valve seats with increased pressure.

6. The valve structure according to claim 5 wherein said discs are provided with a pair of complementary ribs formed on their facing surfaces and said first wedge members are each provided with corresponding grooves on either side thereof for loose engagement with said ribs, whereby said first members are movable with said discs.

7. Valve apparatus according to claim 5 wherein each of said second wedge members comprises a relatively narrow portion extending from said wedging surfaces between said respective pair of elongated members and including a pair of lugs formed at the ends thereof, and said elongated members include recesses adapted to loosely engage said lugs whereby operation of said valve closure means to withdraw said discs from engagement with said seats also moves said elongated members.

8. Valve apparatus according to claim 7 wherein said lugs and said recesses in the elongated members are disposed relative to each other with the valve in the closed position such that operation of the valve closure means to withdraw said discs from engagement with said seats disengages said elongated members from contact with the respective first wedge members prior to movement of said discs.

References Cited by the Examiner

UNITED STATES PATENTS

| 494,580 | 4/93 | Lunkenheimer | 251—202 X |
| 572,451 | 12/96 | Rowe | 251—200 X |
| 869,525 | 10/07 | Schutte | 251—167 |
| 961,594 | 6/10 | Fischer | 251—197 X |
| 1,922,064 | 8/33 | Westling | 251—200 X |
| 2,562,157 | 7/51 | Weinberg | 251—167 |

FOREIGN PATENTS 758,253  10/56  Great Britain.

ISADOR WEIL, *Primary Examiner.*